(12) United States Patent
Beaver et al.

(10) Patent No.: US 9,349,205 B2
(45) Date of Patent: May 24, 2016

(54) SYSTEMS AND METHODS FOR ANIMATING BETWEEN COLLECTION VIEWS

(71) Applicant: APPLE INC., Cupertino, CA (US)

(72) Inventors: Jason C. Beaver, Cupertino, CA (US); Luke T. Heisterman, Cupertino, CA (US); Mathieu Martin, Cupertino, CA (US); Olivier Gutknecht, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 131 days.

(21) Appl. No.: 13/675,802

(22) Filed: Nov. 13, 2012

(65) Prior Publication Data

US 2013/0328888 A1    Dec. 12, 2013

Related U.S. Application Data

(60) Provisional application No. 61/657,731, filed on Jun. 8, 2012.

(51) Int. Cl.
*G06T 13/00* (2011.01)
*G06T 13/80* (2011.01)
*G06T 19/00* (2011.01)

(52) U.S. Cl.
CPC ............ *G06T 13/80* (2013.01); *G06T 19/00* (2013.01)

(58) Field of Classification Search
None
See application file for complete search history.

(56) References Cited

U.S. PATENT DOCUMENTS

| | | | |
|---|---|---|---|
| 7,426,734 | B2 | 9/2008 | Debique et al. |
| 2003/0132959 | A1* | 7/2003 | Simister et al. ............... 345/746 |
| 2006/0090139 | A1 | 4/2006 | Jenni et al. |
| 2009/0119578 | A1 | 5/2009 | Relyea et al. |
| 2010/0205563 | A1* | 8/2010 | Haapsaari et al. ............ 715/825 |
| 2010/0227689 | A1* | 9/2010 | Brunet de Courssou et al. ............................... 463/37 |
| 2011/0060751 | A1* | 3/2011 | English et al. ................ 707/758 |
| 2011/0214079 | A1* | 9/2011 | Young ........................... 715/765 |

OTHER PUBLICATIONS

"Implementing the MVVM Pattern," by Microsoft Inc., published Aug. 28, 2012, http://msdn.microsoft.com/en-us/library/gg405484%28v=pandp.40%29.aspx.
Ashish Ghoda, "Introducing Silverlight 4", ISBN-13 (978-1-4302-2991-9) ISBN-13 (electronic) (978-1-4302-2992-6) published 2010.

* cited by examiner

*Primary Examiner* — James A Thompson
*Assistant Examiner* — Xilin Guo
(74) *Attorney, Agent, or Firm* — Morgan, Lewis & Bockius LLP

(57) ABSTRACT

Techniques, systems, and methods for allowing a user to select amongst different collection views and to animate the transition from one collection view to another. To select a different collection view, the user may provide a certain gesture on the display screen which causes the items displayed in the current collection view to transition in an animated fashion to a new collection view selected by the particular gesture. The particular type of animation between different collection views depends upon the manner in which the items in each collection view are defined in their respective layouts and the manner that facilitates a relatively seamless transition of the items from one layout to another layout.

12 Claims, 16 Drawing Sheets

SYSTEMS AND METHODS FOR ANIMATING BETWEEN COLLECTION VIEWS

CROSS REFERENCE TO RELATED APPLICATIONS

This application is a Non-Provisional Patent Application of U.S. Provisional Patent Application No. 61/657,731, entitled "Systems and Methods for Animating between Collection Views," filed Jun. 8, 2012, which is herein incorporated by reference.

BACKGROUND

The present disclosure relates generally to graphical views on electronic devices and, more particularly, to techniques for animating between different graphical views.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Many electronic devices use various applications to illustrate a collection of items. For example, certain photo applications may display a collection of photographs in a grid layout so that a user may scroll through the photographs to select one or more to view. Moreover, when a user has multiple photo albums stored on the device, the photo application may display each photo album on the screen in the form of a stack of photographs with a selected photograph on top. When the user selects one of the photo albums to view, the stack of photographs disappears and the grid of photographs appears with no animation or movement from one view to other. Similarly, certain music applications may display a collection of different album covers in either a grid layout or a cover flow layout to allow a user to look through the albums to select one to play. Again, however, when the user changes from one view to the other, the previous view disappears from the screen and the new view appears without any animation or movement from one view to the other.

While having different ways to view a collection of items is desirable because it gives a user different ways to organize and select amongst a collection of items, the manner of selecting which view to display and the manner of transitioning from one view to another tends to be somewhat abrupt. Hence, it would enhance a user's experience to improve the manner in which different views are selected and to improve the transition from one view to another.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to various techniques, systems, and methods for allowing a user to select amongst different collection views and to animate the transition from one collection view to another. To select a different collection view, the user may provide a certain gesture on the display screen which causes the items displayed in the current collection view to transition in an animated fashion to a new collection view selected by the particular gesture. The particular type of animation between different collection views depends upon the manner in which the items in each collection view are defined in their respective layouts and the manner that facilitates a relatively seamless transition of the items from one layout to another layout.

Various refinements of the features noted above may be made in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Figure 1:
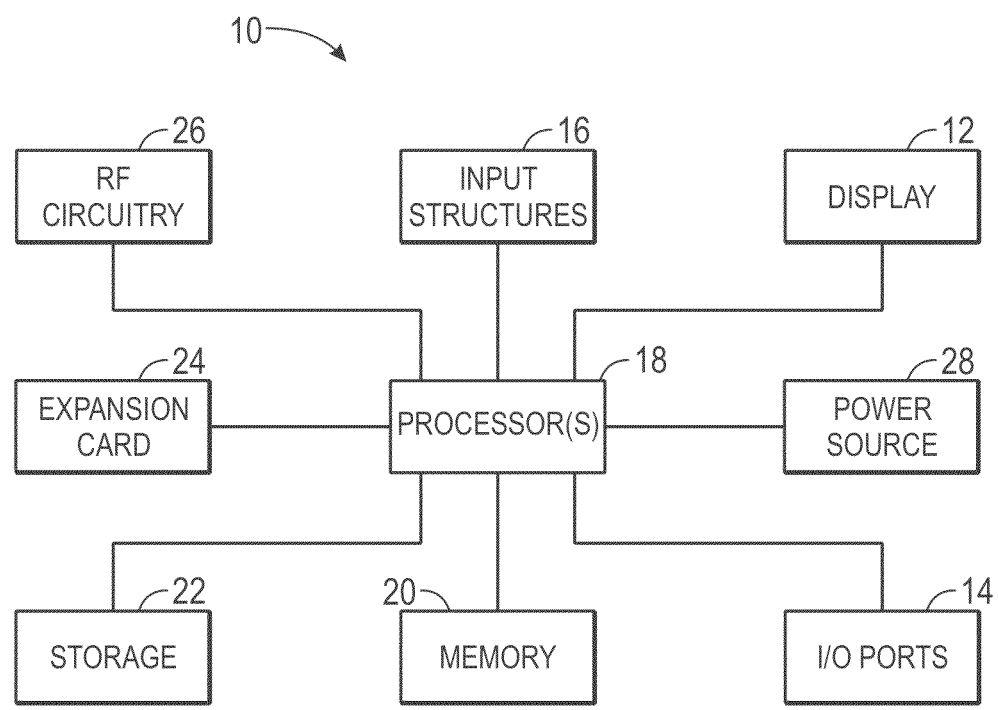
FIG. 1 illustrates a block diagram of an electronic device that may use the graphical techniques disclosed herein, in accordance with aspects of the present disclosure.
Figure 2:
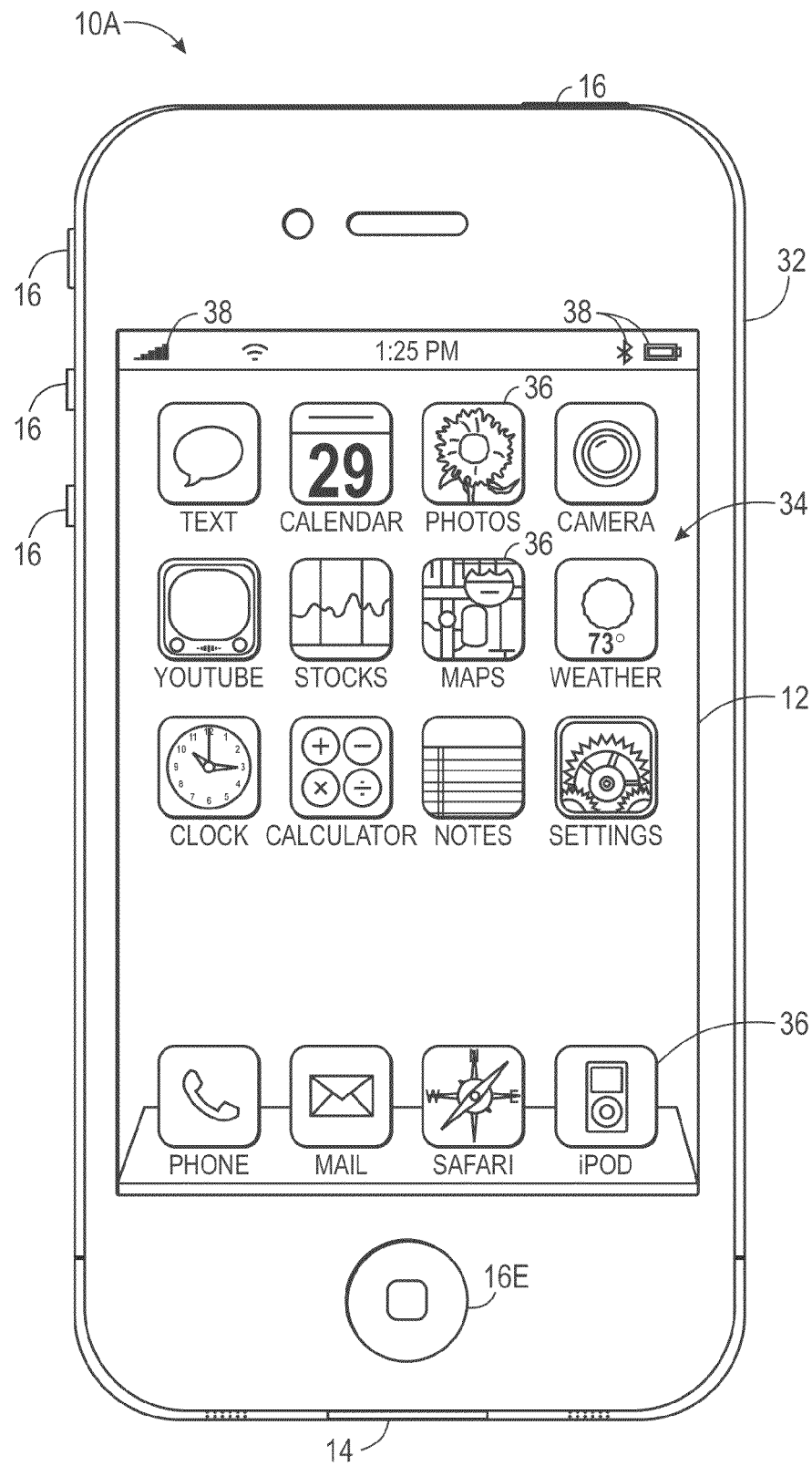
FIG. 2 illustrates a front view of a handheld device, such as an iPhone, representing another embodiment of the electronic device of FIG. 1, in accordance with an embodiment.
Figure 3:
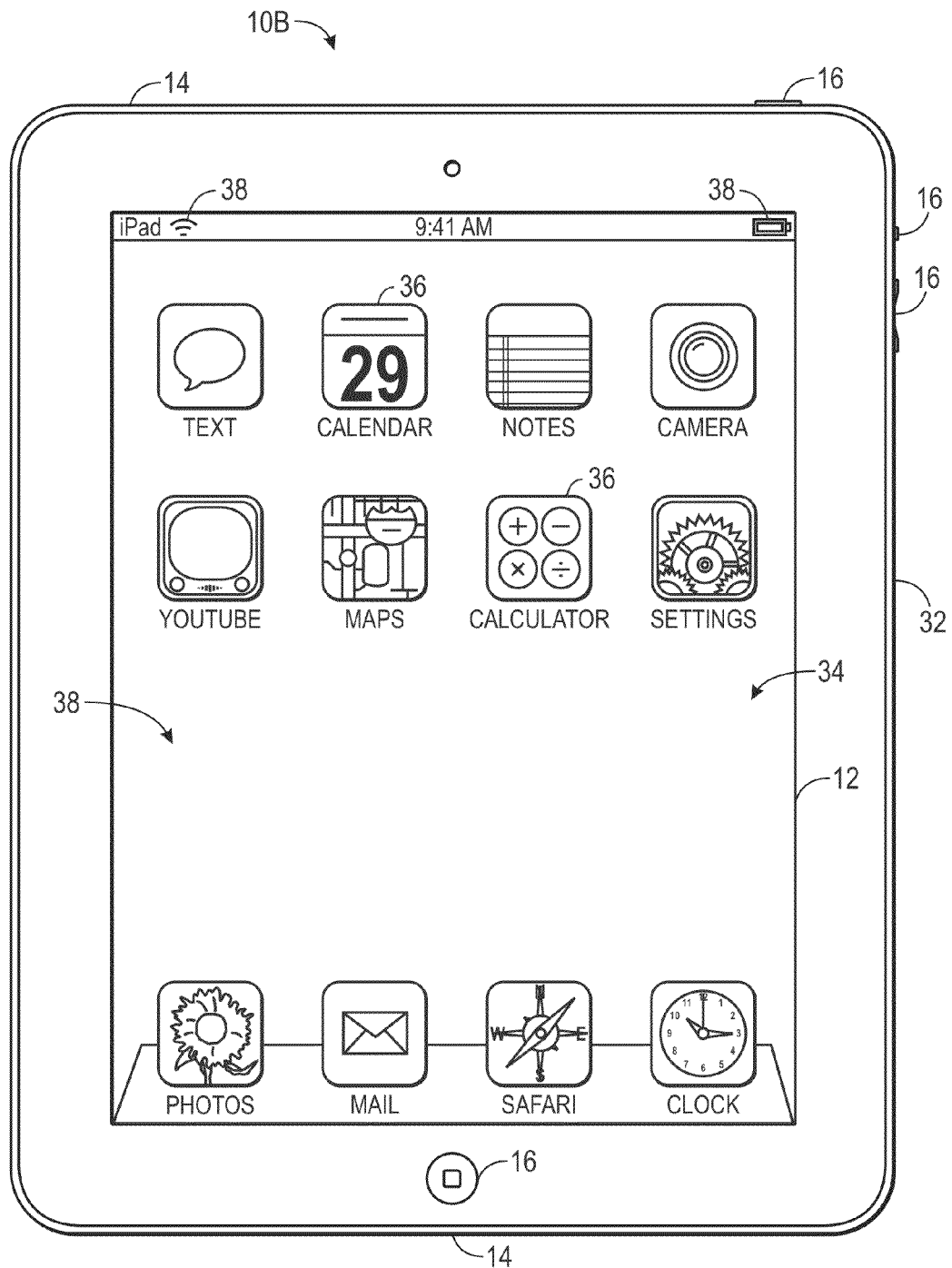
FIG. 3 illustrates a front view of a tablet device, such as an iPad, representing a further embodiment of the electronic device of FIG. 1, in accordance with an embodiment.
Figure 4:
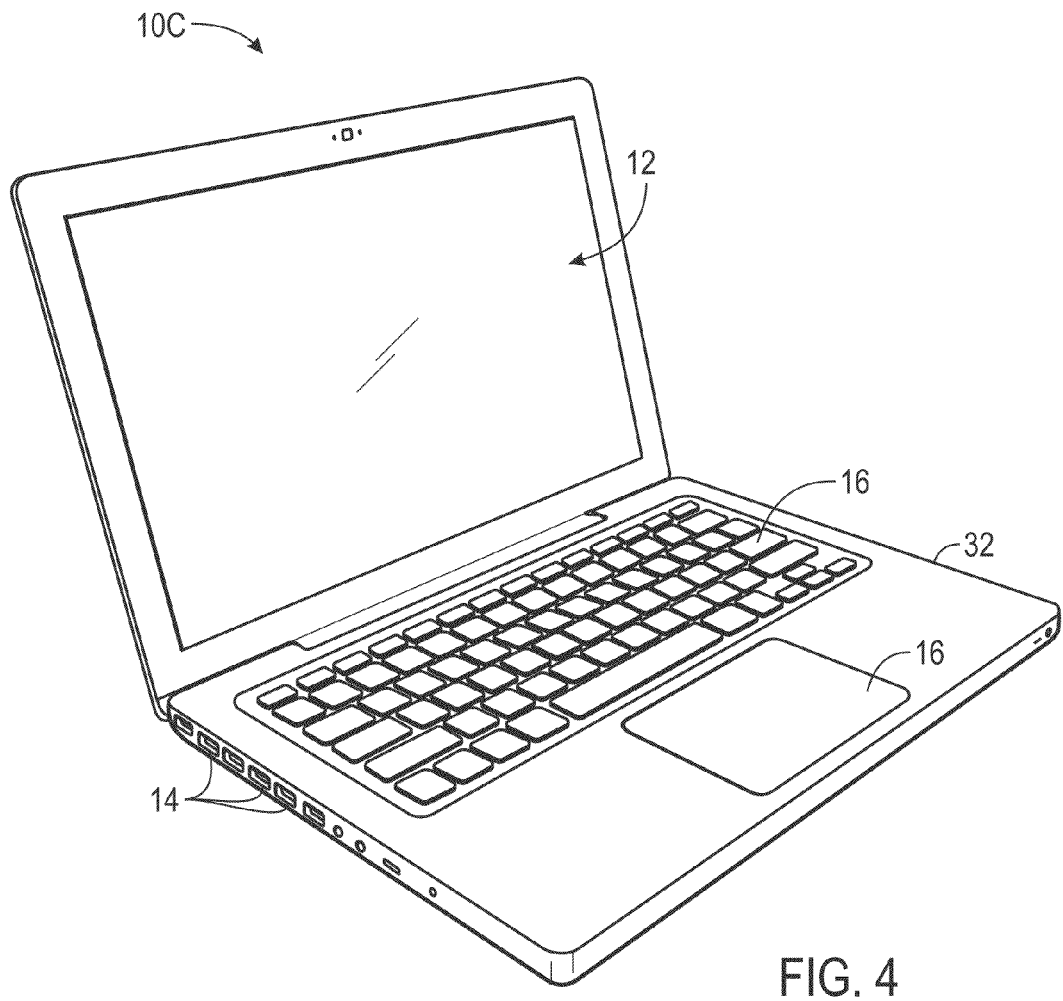
FIG. 4 illustrates a front view of a laptop computer, such as a MacBook, representing an embodiment of the electronic device of FIG. 1, in accordance with an embodiment.

With the foregoing in mind, it is useful to begin with a general description of suitable electronic devices that may employ the animation techniques described below. In particular, FIG. 1 is a block diagram depicting various components that may be present in an electronic device suitable for implementing such animation techniques. FIGS. 2, 3, and 4 respectively illustrate front and perspective views of suitable electronic devices, which may be, as illustrated, a handheld electronic device, a tablet computing device, or a notebook computer.

Turning first to FIG. 1, an electronic device 10 according to an embodiment of the present disclosure may include, among other things, a display 12, input/output (I/O) ports 14, input structures 16, one or more processor(s) 18, memory 20, nonvolatile storage 22, an expansion card 24, RF circuitry 26, and a power source 28. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10.

By way of example, the electronic device 10 may represent a block diagram of the handheld device depicted in FIG. 2, the tablet computing device depicted in FIG. 3, the notebook computer depicted in FIG. 4, or similar devices, such as desktop computers. It should be noted that the processor(s) 18 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 18 and/or other data processing circuitry may be operably coupled with the memory 20 and the nonvolatile storage 22 to execute instructions. Such programs or instructions executed by the processor(s) 18 may be stored in any suitable article of manufacture that includes one or more tangible, computer-readable media at least collectively storing the instructions or routines, such as the memory 20 and the nonvolatile storage 22. The memory 20 and the nonvolatile storage 22 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 18.

The display 12 may be a touch-screen liquid crystal display (LCD), for example, which may enable users to interact with a user interface of the electronic device 10. In some embodiments, the electronic display 12 may be a MultiTouch™ display that can detect multiple touches at once.

The input structures 16 of the electronic device 10 may enable a user to interact with the electronic device 10 (e.g., pressing a button to increase or decrease a volume level). The I/O ports 14 may enable electronic device 10 to interface with various other electronic devices, as may the expansion card 24 and/or the RF circuitry 26. The expansion card 24 and/or the RF circuitry 26 may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter.

As mentioned above, the electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). FIG. 2 depicts a front view of a handheld device 10A, which represents one embodiment of the electronic device 10. The handheld device 10A may represent, for example, a portable phone, a media player, a personal data organizer, a handheld game platform, or any combination of such devices. By way of example, the handheld device 10A may be a model of an iPod® or iPhone® available from Apple Inc. of Cupertino, Calif.

The handheld device 10A may include an enclosure 32 to protect interior components from physical damage and to shield them from electromagnetic interference. The enclosure 32 may surround the display 12, which may include a screen 34 for displaying icons 36. The screen 34 may also display indicator icons 38 to indicate, among other things, a cellular signal strength, Bluetooth connection, and/or battery life. The I/O ports 14 may open through the enclosure 32 and may include, for example, a proprietary I/O port from Apple Inc. to connect to external devices.

User input structures 16, in combination with the display 12, may allow a user to control the handheld device 10A. For example, the input structures 16 may activate or deactivate the handheld device 10A, navigate a user interface to a home screen, navigate a user interface to a user-configurable application screen, activate a voice-recognition feature of the handheld device 10A, provide volume control, and toggle between vibrate and ring modes. The electronic device 10 may also be a tablet device 10B, as illustrated in FIG. 3. For example, the tablet device 10B may be a model of an iPad® available from Apple Inc.

In certain embodiments, the electronic device 10 may take the form of a computer, such as a model of a MacBook®, MacBook® Pro, MacBook Air®, iMac®, Mac® mini, or Mac Pro® available from Apple Inc. By way of example, the electronic device 10, taking the form of a notebook computer 10C, is illustrated in FIG. 4 in accordance with one embodiment of the present disclosure. The depicted computer 10C may include a housing 32, a display 12, I/O ports 14, and input structures 16. In one embodiment, the input structures 16 (such as a keyboard and/or touchpad) may be used to interact with the computer 10C, such as to start, control, or operate a GUI or applications running on computer 10C. For example, a keyboard and/or touchpad may allow a user to navigate a user interface or application interface displayed on the display 12.

An electronic device 10, such as the devices 10A, 10B, and 10C discussed above, may run certain applications that deal with collections of items. For example, photo applications allow a user to manage a user's collections of photographs, music applications allow a user to manage the user's collections of songs and/or albums, and video applications allow a user to manage a collection of videos, movies and other similar items. Applications of this type typically allow a user to organize their collections in different views that may be displayed to the user to allow the user to view their collection and/or select amongst the items in their collection.

Figure 5:
FIG. 5 illustrates a collection of multiple stacks of items.
Figure 6:
FIG. 6 illustrates a collection of items displayed in a grid pattern.
Figure 7:
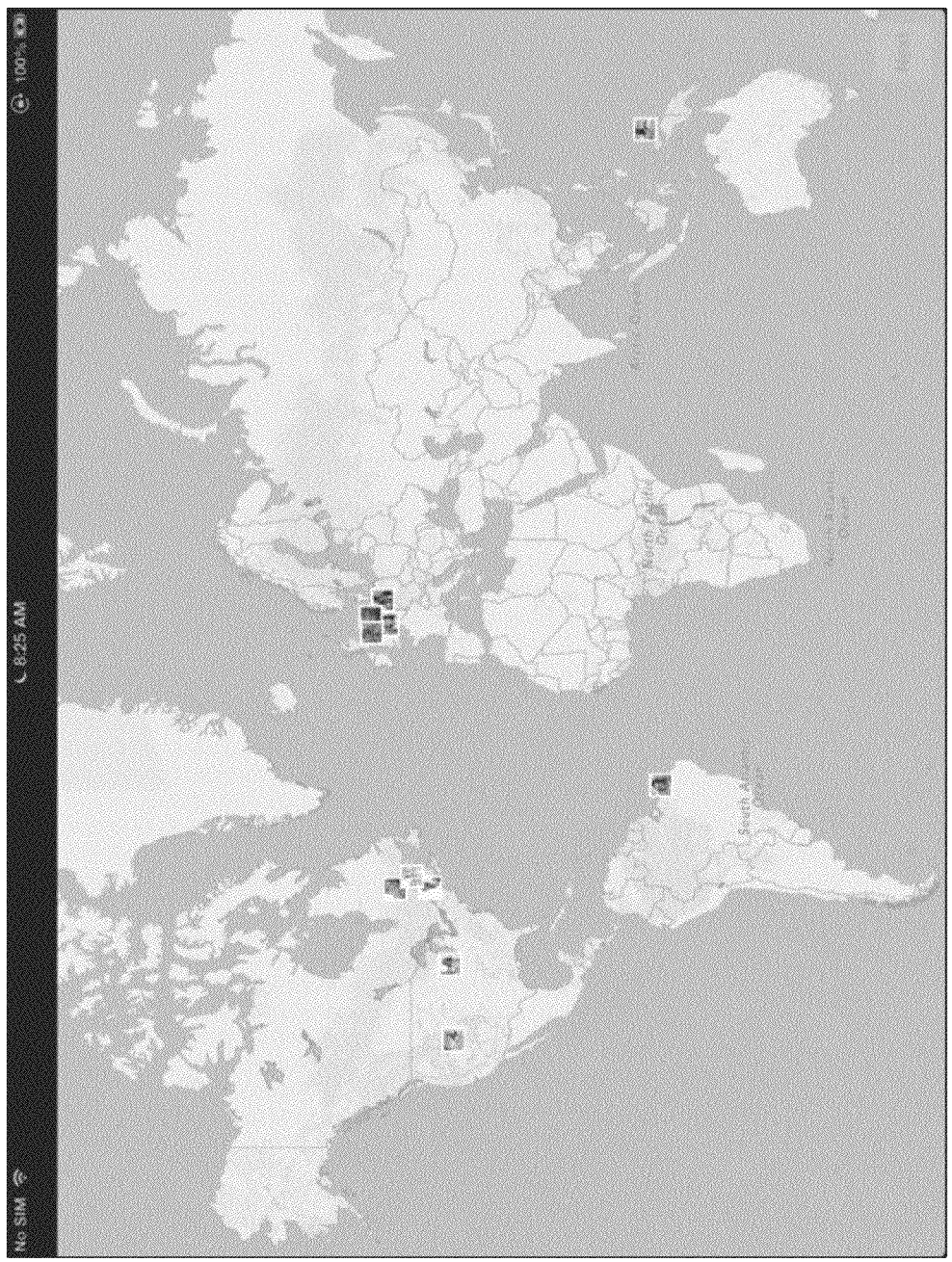
FIG. 7 illustrates a collection of items displayed according to a geographic location associated with each item.
Figure 8:
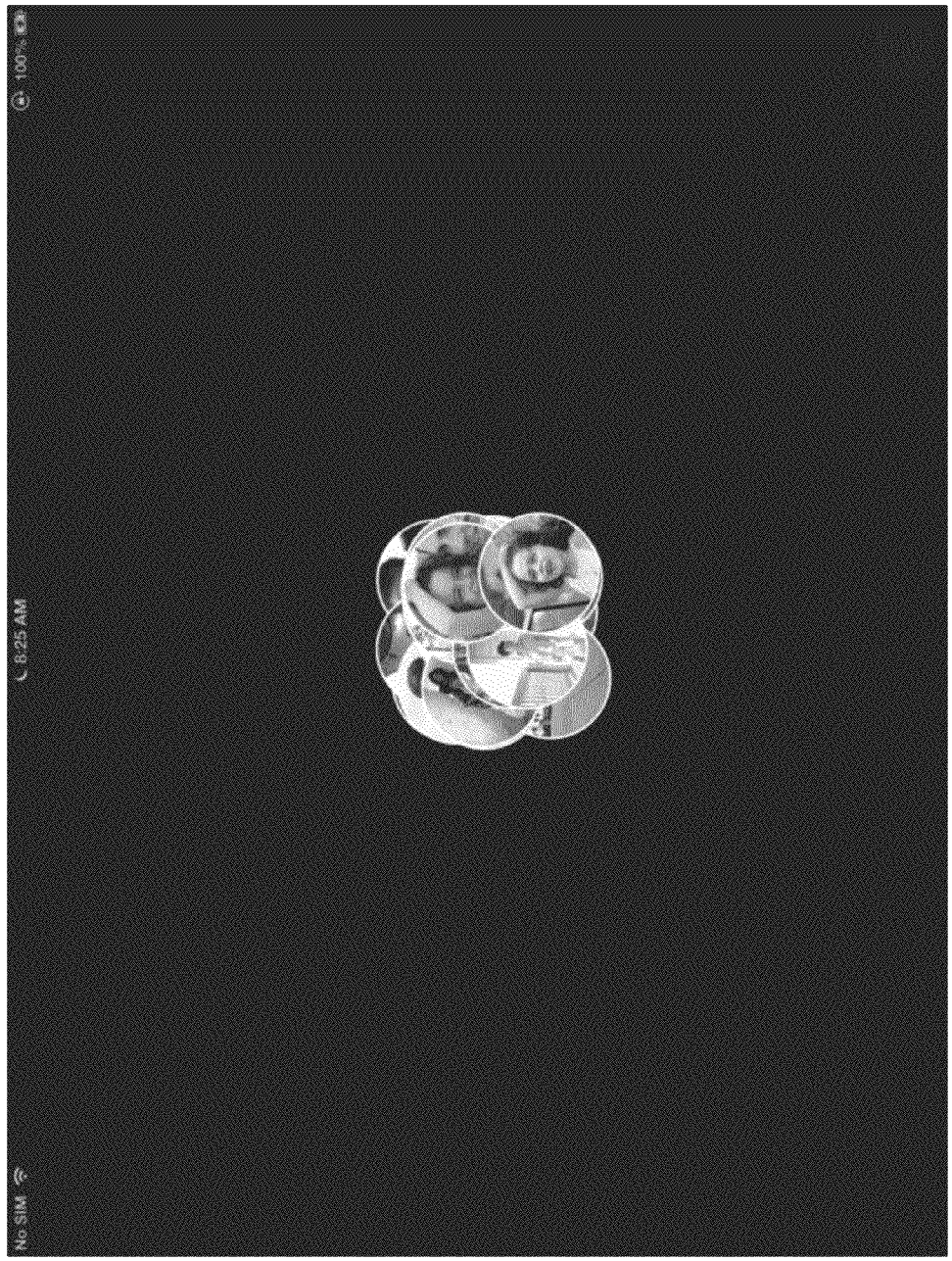
FIG. 8 illustrates a collection of items in a cluster.
Figure 9:
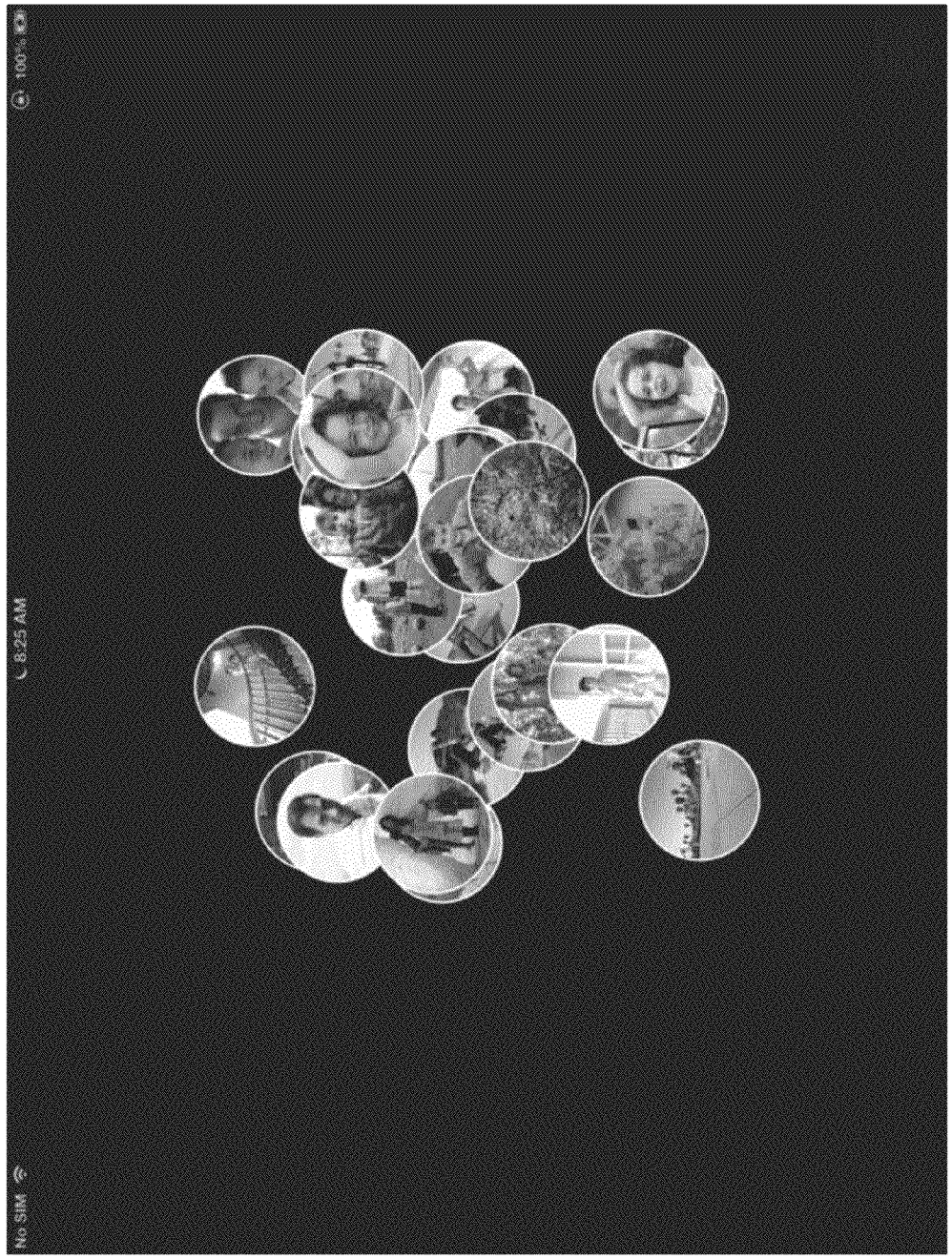
FIG. 9 illustrates a collection of items in a random pattern.
Figure 10:
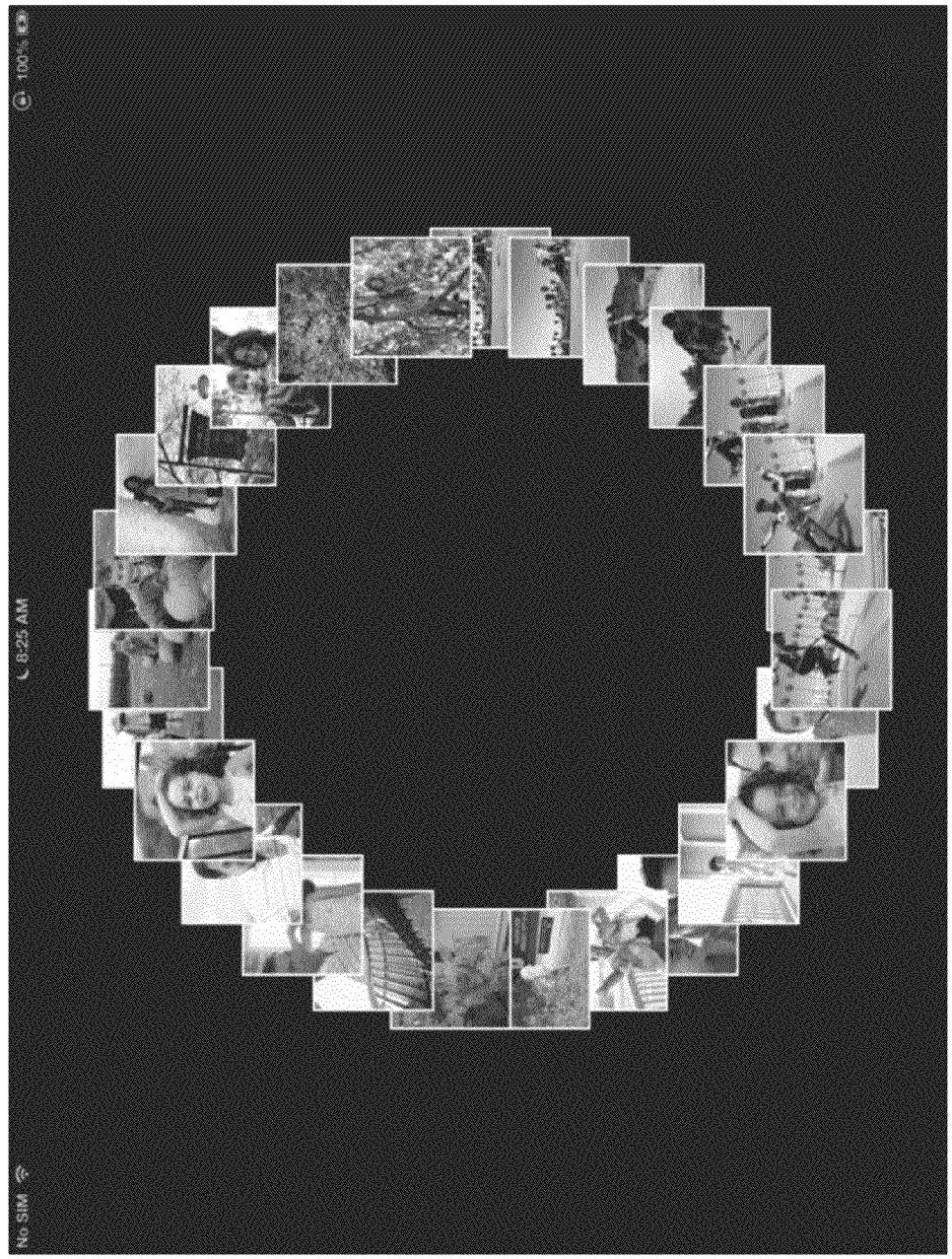
FIG. 10 illustrates a collection of items in a circular pattern.
Figure 11:
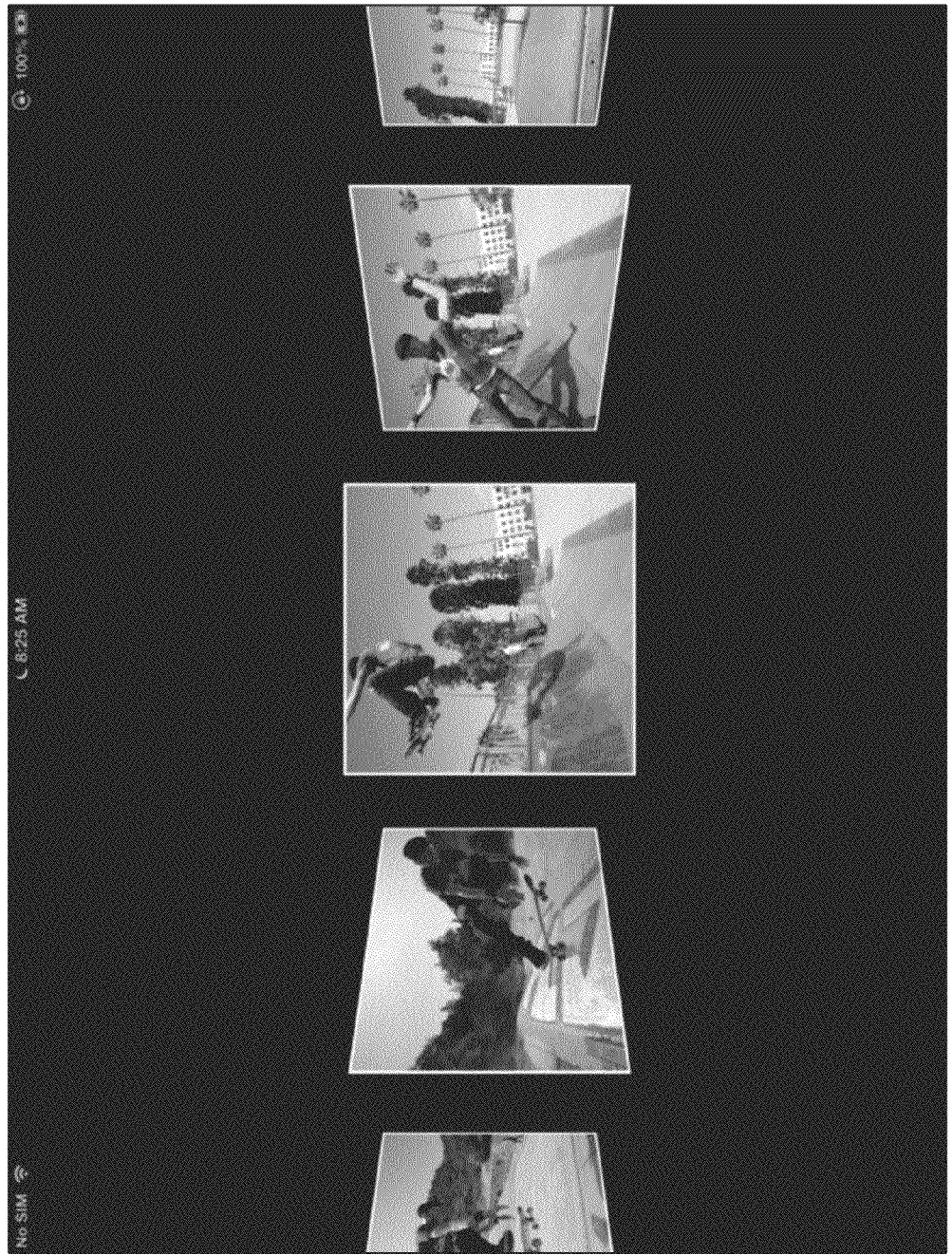
FIG. 11 illustrates a collection of items in a cover flow pattern.

In a photo application, a user may be able to organize their photographs or photo albums in one or more of the views depicted in FIGS. 5-11. As illustrated in FIG. 5, for example, a user may organize their photographs into four different photo albums, where each album is displayed as a stack of photographs with a single photograph on top that enables the user to determine the content of each particular photo album. The photographs in the user's collection, such as the photographs in each of the albums, may be displayed in various ways. For example, FIG. 6 illustrates a collection of photographs that are displayed in a grid pattern, which may enable a user to easily view each entire photograph and to select one or more photographs for viewing on a full screen. Alternatively, the photo application may tag each photograph with the location from which it was taken. Accordingly, the user may be able to display a collection of photographs that are organized on a map based upon the location where each photograph was taken as illustrated in FIG. 7. Furthermore, the user may be able to view a collection of photographs or a photo album as a cluster of overlapping photographs as illustrated in FIG. 8, or as a random arrangement of complete and partially overlapping photographs as illustrated in FIG. 9. Alternatively, a user may be able to view a collection of photographs in a circular arrangement, as illustrated in FIG. 10, or in a cover flow arrangement as illustrated in FIG. 11.

Each arrangement of items, such as the different arrangements of photographs illustrated in FIGS. 5-11, includes a layout of each item that is defined by the particular application, such as the photo application. As discussed in detail below, the present techniques manage an ordered collection of data items and present them using customizable layouts. Collection views support customizable layouts that can be used to implement multi-column grids, tiled layouts, circular layouts, and many more types of layouts. In certain embodiments, it is possible to change the layout of a collection view dynamically.

Figure 12:
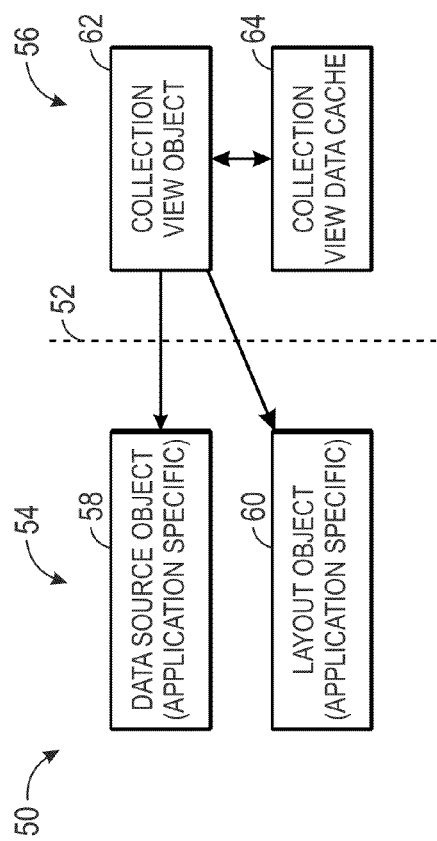
FIG. 12 illustrates a block diagram of an example of a system for integrating a collection view object with an application having a data source.

When adding a collection view to a user interface, an application's main job is to manage the data associated with that collection view. FIG. 12 illustrates a block diagram of an example of a system 50 for integrating a collection view with such an application. As illustrated, the system 50 is separated by line segment 52 into an application 54 and a collection view portion 56. The application 54 may include any suitable application having a data source object 58. For example, the application 54 may include an application having a collection of photographs, music, videos, and so forth. Such collections include data that may be modified, accessed, and/or stored by the data source object 58. The application 54 may also include a layout object 60 that determines the layout for displaying the collection stored by the data source object 58.

The collection view portion 56 operates independently from the application 54 and is configured to receive data from proprietary and/or non-proprietary applications 54. Moreover, the collection view portion 56 includes a collection view object 62 configured to receive data provided by the application 54 via the data source object 58. The collection view object 62 is also configured to receive layout data provided by the application 54 via the layout object 60. Data received by the collection view object 62 is organized into individual items, which can then be grouped for presentation. An item is the smallest unit of data the application 54 may present. For example, in a photo application, an item may be a single image. The collection view object 62 is configured to present items onscreen using a cell, which is an instance of what the data source object 58 provides to the collection view object 62.

In addition to its cells, a collection view object 62 can present data using other types of views too. These supplementary views may include section headers and footers, such as titles of photo albums that are separate from the individual cells but still convey some sort of information. Support for supplementary views may be defined by the collection view's layout object, which is also responsible for defining the placement of those views. It is also possible to add, delete, or rearrange data in a collection, and coordinate with collection view to insert, delete, and rearrange the corresponding cells.

Collection Views and Layout Objects

As discussed above, one object associated with the collection view object 62 is the layout object 60. The layout object 60 is responsible for defining the organization and location of all cells and supplementary views inside the collection view object 62. Although it defines their locations, the layout object 60 does not actually apply that information to the corresponding views. Because the creation of cells and supplementary views involves coordination between the collection view object 62 and the data source object 58, the collection view object 62 actually applies layout information to the views. Thus, in a sense, the layout object 60 is like another data source, only providing visual information instead of item data.

The layout object 60 may be specified when creating the collection view object 62, but it is also possible to change the layout of the collection view object 62 dynamically. Changing it will update the layout, with or without animating the changes.

Cells and Supplementary Views

The data source object 58 provides both the content for items and the views used to present that content. When the collection view object 62 first loads the content from the data source object 58, the collection view object 62 asks the data source object 58 to provide a view for each visible item.

Certain embodiments may use a view reuse technique to minimize memory and CPU usage. With this technique, a developer may register a class or a user interface description file, and the collection view portion 56 may manage the allocation and deallocation of views, only enabling the application 54 to configure the actual view content when needed. For example, the collection view object 62 may store views in a collection view data cache 64 when the views move off-screen. As new views are needed, the collection view object 62 may first attempt to dequeue a view from the collection view data cache 64 to speed up processing. Thus, in some embodiments, a new view may be created only if the collection view data cache 64 is empty. This technique can be applied to cells, supplementary views, and decoration views. After getting the layout information from the layout object 60, the collection view object 62 applies it to the view and displays the data from the data source object 58.

View Collection Layouts

The job of the layout object 60 is to determine the placement of cells, supplementary views, and decoration views inside the bounds the collection view object 62 and to report that information to the collection view object 62 when requested. The collection view object 62 then applies the provided layout information to the corresponding views so that they can be presented onscreen.

The main job of the layout object 60 is to provide information about the position and visual state of items in the collection view object 62. The layout object 60 does not create the views for which it provides the layout. Those views are created by the data source object 58. Instead, the layout object 60 defines the position and size of visual elements based on the design of the layout.

Collection views 62 may have three types of visual elements that may be laid out:

Cells are the main element managed by the layout. Each cell represents a single data item in the collection. The collection view object 62 can have a single group of cells or it may divide those cells into multiple sections. The main job of the layout object 60 is to organize the cells of the collection view object 62.

Supplementary views present data but are different than cells. Unlike cells, in some embodiments, supplementary views may not be selected by the user. Instead, supplementary views may be used to implement things like header and footer views for a given section or for the entire collection view object 62. Supplementary views, their use, and their placement are defined by the layout object 60. In other embodiments, supplementary views may be selectable by the user.

Decoration views are another type of visual elements. Unlike supplementary views and cells, these are not directly controlled by the application data model, but are visual adornments provided by the layout object 60. Their use and placement is also defined by the layout object 60. In some embodiments, decoration views cannot be selected by the user. In other embodiments, decoration views are selectable by the user.

The collection view object 62 asks the layout object 60 to provide layout information for these elements at many different times. Every cell and view that appears on screen is positioned using information from the layout object 60. Similarly, items are inserted into or deleted from the collection view object 62, additional layout occurs for the items being added or removed. However, the collection view object 62 limits the layout to the objects that are visible onscreen.

Every layout may return information about:
the overall layout size;
whether the layout should be recomputed immediately when the visible portion of the collection view object 62 changes (e.g., coverflow layout), keeping in mind that the collection view object 62 need not display data on a full screen;
what the layout attributes of cells, decoration views, and supplementary views contained in a given rectangle are (e.g., a subset of the overall layout size);
what the layout attributes for cell with a given identifier are;
what the layout attributes for a supplementary view kind with a given identifier are (optional); and
what the layout attributes for a decoration view kind with a given identifier are (optional).

These methods provide the layout information that the collection view object 62 may use to place contents on the screen.

When the data in the collection view object 62 changes and items are to be inserted or deleted, the collection view object 62 requests that the layout object 60 update the layout information. Specifically, any item that is moved, added, or deleted has its layout information updated to reflect its new location. For moved items, the collection view object 62 uses the standard methods to retrieve the item's updated layout attributes. For items being inserted or deleted, the collection view object 62 may call some different methods which may be defined by the application developer and may determine a default set of attributes, such as:

determining layout attributes for the initial state of a newly appearing cell (e.g., via an algorithm—In certain embodiments, the collection view object 62 may animate the newly appearing cell from the determined initial state to the final state of the newly appearing cell); and determining layout attribute for the final state of a newly disappearing cell (e.g., via an algorithm—In certain embodiments, the collection view object 62 may animate the newly disappearing cell from its current state to the final state).

View Collection Layout Attributes

Collection view layout attributes manage the layout-related attributes for a given item in the collection view object 62. Layout object 60 creates attributes when requested to do so by the collection view object 62. In turn, the collection view object 62 uses the layout information to position cells, supplementary views, and decoration views inside its bounds.

The layout object 60 defines the layout attributes for a cell, not the cell's actual content (which might be text, image, video, or any content).

Layout attributes may describe a cell's:
position (e.g., the center for the cell),
size (e.g., a rectangular area),
opacity (e.g., in a range between transparent and opaque),
z-index (e.g., relative ordering of the cell with other cells, in case they are overlapping), and
a generic geometric 3D or 2D transform.

The 3D transform may describe a transformation applied to the cell bounding rectangle: scaling, rotation (e.g., 2D), orientation in 3D space (e.g., for perspective effect like coverflow).

Layout attributes are generic and may be extended by the application 54, so that the application 54 may communicate additional layout decision to the actual cell (e.g., "this cell is near a margin—so apply a small gradient on the side," or "this layout attribute describes the final cell and should be clipped to look like a star").

Collection Views

Once the data for the objects or items in the collection and the layout of each of the objects in each different collection view have been specified by the particular application 54 (such as the photo application discussed above), the objects or items in one collection view layout may be transitioned in an animated fashion to another of the defined collection view layouts. The initiation of this transition and the selection of the next collection view object 62 may be determined by a particular type of gesture input by the user. For example, if the user is viewing a cluster of photographs, as illustrated in FIG. 8, and desires to transition to viewing the photographs in a circular orientation, as illustrated in FIG. 10, the user may touch the cluster of photographs and make a circular motion on the screen to initiate the movement of the cluster of photographs into the circular configuration. Similarly, if the user wishes to view the cluster of photographs, as illustrated in FIG. 8, in a grid arrangement, as illustrated in FIG. 6, the user may touch the cluster photographs with two fingers and perform a multi-touch spreading gesture to initiate the transition of the cluster of photographs into a grid arrangement.

Generic Layout Consistency and Caching Algorithms

Figure 13:
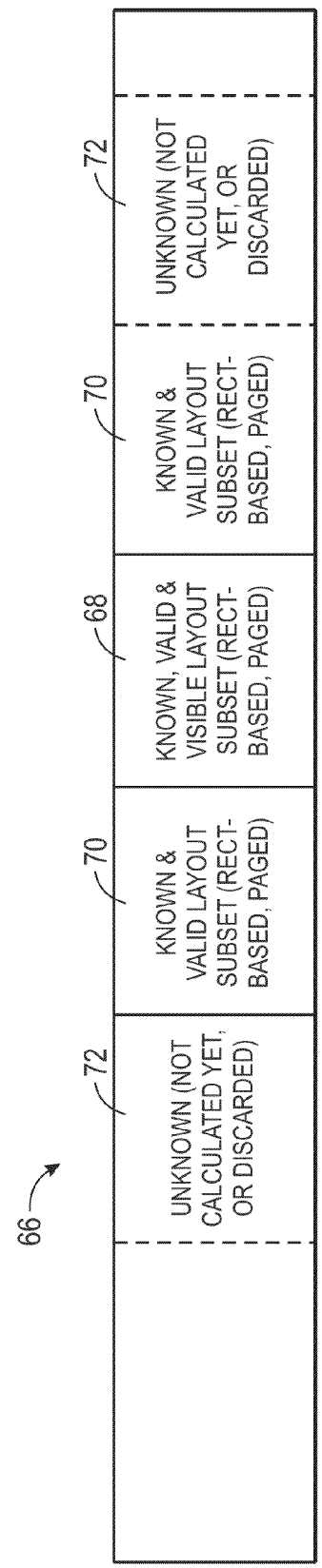
FIG. 13 illustrates a technique for caching data that may be displayed to a user.

The system 50, as illustrated in FIG. 12, defines a data structure that tracks the layout state provided by the layout object 60 with the data model provided by the data source object 58, even when the layout object 60 and the data source object 58 are provided by a third party relative to the collection view portion 56 (e.g., the entity that developed the application 54 is separate from the entity that developed the collection view portion 56). The system 50 facilitates the layout state being consistent with the data model at any time for a given portion of the visible area of the display 12. Thus, the collection view portion 56 may track visible items, preload, or keep around already computed areas. The collection view portion 56 may use memory pages to navigate through data from the data source object 58. Accordingly, FIG. 13 illustrates a caching system 66 that uses a paged-based caching in which the caching system 66 computes and caches layout information based on whole pages of content the user is likely to bring onscreen. For example, data for known, valid, and visible layout subsets may be cached in one or more pages 68. Moreover, data for known and valid (e.g., but not visible) layout subsets may be cached in one or more pages 70. Furthermore, unknown, old, or discarded data may not be paged, thereby reserving pages 72 for storing known, valid, and/or visible data when desired.

Rotation Animations

As discussed above, when changing between collection views (e.g., views within a collection such as views resulting from an addition, deletion, movement, or rotation of one or more items, or between different types of collection views as illustrated in FIGS. 6-11) items may be animated to enhance viewing appeal for a user. Accordingly, the collection view object 62 may determine data corresponding to an animation. The collection view object 62 may then provide the data to an animation model for executing the animation. The animation may utilize any suitable animation model, such at that disclosed in U.S. Pat. No. 7,903,115, issued on Mar. 8, 2011, and entitled "Animations," which is hereby incorporated by reference in its entirety for all purposes.

Moreover, various systems may use different techniques to detect potential distracting animations and keep the animations visually pleasing. For example, in embodiments in which animations occur after an object is rotated, a system may detect if the layout state before and after the animation will result in different cells being in the same position. In such a case, instead of automatically animating the cells, the system may crossfade between the two cells in the same position.

Layout Change Animations

When switching between two layouts, the collection view object 62 may implement a generic animation framework by performing one or more of the following:

for the currently visible area, visible cell placement and appearance (e.g., position, size, opacity, transform, relative z-index, and/or ordering) may be determined (e.g., computed) by the collection view object 62 for the outgoing and incoming layout;

using the determined outgoing and incoming layouts, the collection view object 62 may determine common cells, cells disappearing from the first layout, and cells appearing in the second layout;

for disappearing cells, the collection view object 62 may use the outgoing layout to determine whether disappearing cells should animate to a specific visual state (e.g., size, position, opacity, transform, z-index);

for appearing cells, the collection view object 62 may use the incoming layout to determine whether appearing cells should animate to a specific visual state;

if a layout does not define any specific final or initial state, the collection view object 62 may default to a fade-in (e.g., for appearing cells) or fade-out (e.g., for disappearing cells);

when globally animating a layout change, for each common cell, the collection view object 62 may set up an animation transforming the cell from its appearance in the outgoing layout to its appearance in the incoming layout;

removed cells may be animated from their current (e.g., initial) state in the incoming layout to their final state (e.g., as specified by the layout as explained above, or by keeping the same state and only changing its opacity to fully transparent);

added cells may be animated from their initial state (e.g., as specified by the layout as explained above, or by using their future (e.g., final) state and only changing the starting opacity to fully transparent), to their final state as specified by the layout;

the collection view object 62 may map all specified layout attributes to an actual view in the graphic systems, and all animation may be executed simultaneously; and an application might supplement this description of a cell visual state with any additional property. The system will correctly keep additional data and send it to the actual cell so any additional visual customization may be applied to the cell and animated.

Such an implementation may provide an animated transition between two arbitrary layouts, each cell state being described with specific layout attributes (e.g., size, opacity, position, transform, z-index, application-specific data, and so forth).

Figure 14:
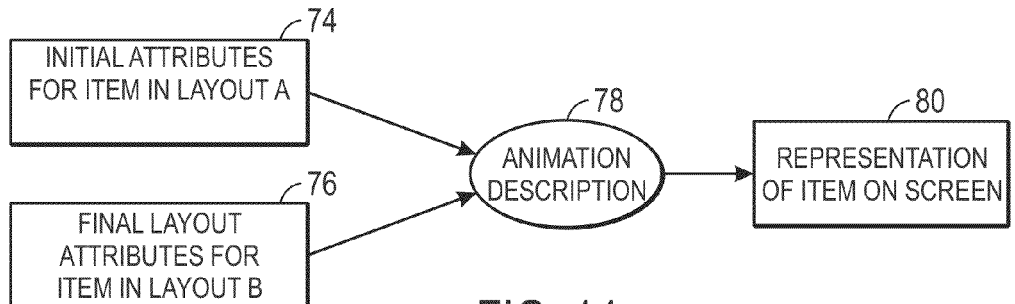
FIG. 14 illustrates a technique for animating an item from one layout in a first collection view to another layout in a second collection view.
Figure 15:
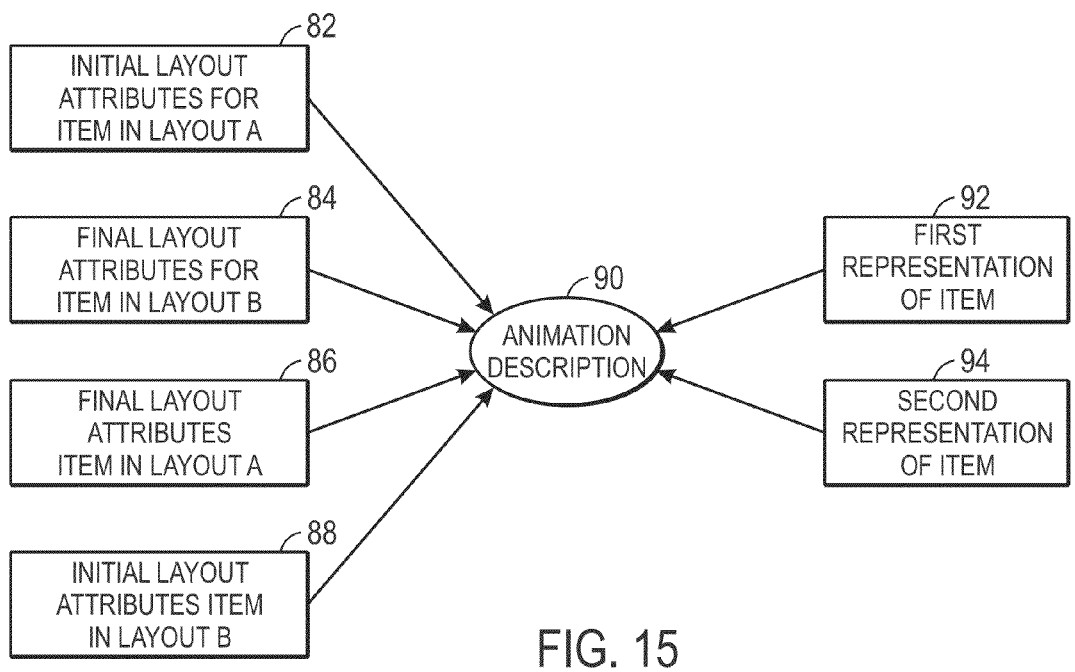
FIG. 15 illustrates another technique for animating an item from one layout in a first collection view to another layout in a second collection view.

In certain embodiments, a single representation of an item may be depicted to show a transition of the item from a first collection view layout (e.g., layout A) to a second collection view layout (e.g., layout B). As illustrated in FIG. 14, initial layout attributes for an item in layout A (block 74) and final layout attributes for the item in layout B (block 76) may be combined to form an animation description (block 78). In one embodiment, the collection view object 62 may receive the initial and final layout attributes and may determine the animation description. The animation description includes a combination of parameters that are provided to an animation model to animate the item. In the illustrated embodiment, the animation description provides a combination of parameters to the animation model to animate a single representation of the item on a screen (block 80). However, in other embodiments, the animation description may provide a combination of parameters to the animation model to animate a dual representation of the item on the screen, as illustrated in FIG. 15. The determination of whether to animate a single representation or a dual representation of the item may be made using predetermined logic (e.g., such as by using logic within the collection view object 62), as explained below.

Specifically, FIG. 15 illustrates a diagram for animating from layout A to layout B by providing dual visual representations of a single item in which each of the dual representations of the item are animated simultaneously. This allows for a first visual representation of the item to be faded-out from one position while a second visual representation of the item is being faded-in at a different position. In certain embodiments, the first visual representation of the item may disappear by moving off the right side of the screen while the second visual representation of the item may appear by moving on from the left the side of the screen.

As illustrated in FIG. 15, initial layout attributes for an item in layout A (block 82), final layout attributes for the item in layout B (block 84), final layout attributes for the item in layout A (block 86), and initial layout attributes for the item in layout B (block 88) may be combined to form the animation description (block 90). In one embodiment, the collection view object 62 may receive each of the initial and final layout attributes and may determine the animation description. In the illustrated embodiment, the animation description provides a combination of parameters to the animation model to animate a first representation of the item on a screen (block 92) and to animate a second representation of the item on the screen (block 94) at the same time. Instead of creating a single animation with layout A and layout B as the beginning and end states, respectively, the item is duplicated (e.g., cloned) and two simultaneous animations are displayed. For example, the first animation may display a transition of the item from an initial state (e.g., based on the initial layout attributes) in layout A to a final state (e.g., based on the final layout attributes) in layout A. Moreover, the second animation may display a transition of the item from an initial state (e.g., based on the initial layout attributes) in layout B to a final state (e.g., based on the final layout attributes) in layout B.

Figure 16:
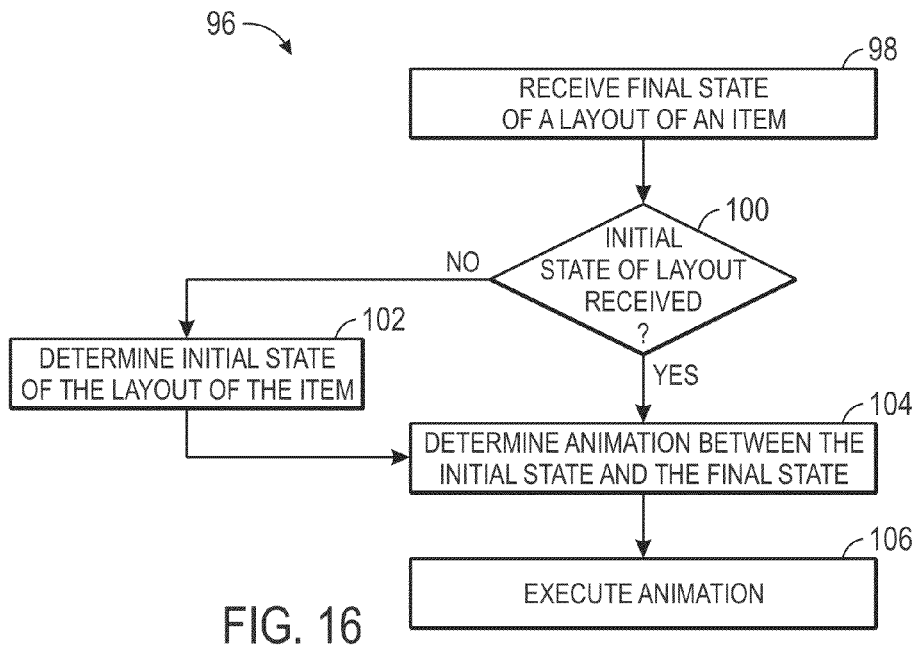
FIG. 16 illustrates a flow chart of a method for animating an item.

Various logic may be used by the collection view object 62 to determine an animation to be displayed when transitioning between different collection view layouts. Accordingly, FIG. 16 illustrates a flow chart of one embodiment of a method 96 for animating an item. The collection view object 62 (or a different portion of a software application) receives data corresponding to a final state of a layout of an item in a collection, such as from the layout object 60 (block 98). In certain embodiments, the collection view object 62 may receive data corresponding to the final state of the layout of multiple items in a collection. The collection view object 62 determines whether the initial state of the layout of the item in the collection has been received (block 100). If the collection view object 62 has not received the initial state of the layout of the item, the collection view object 62 determines the initial state of the layout of the item (block 102).

The initial state of the layout of the item may be determined using any suitable method. For example, for an item added to or moved within the layout, the initial state of the layout may be the same as the final state of the layout, except that the initial state of the layout has the opacity of the item set to be transparent and the final state of the layout has the opacity of the item set to be fully visible. As another example, for an item removed from the layout, the initial state of the layout may be the same as the final state of the layout, except that the initial state of the layout has the opacity of the item set to be fully visible and the final state of the layout has the opacity of the item set to be transparent.

After determining the initial state of the layout of the item, the collection view object 62 determines an animation between the initial state of the layout of the item and the final state of the layout of the item (block 104). In certain embodiments, the animation may be determined by determining a change in at least one of a position, a scale, a rotation, and/or opacity of the item. The animation is also determined if the initial state of the layout of the item is received by the collection view object 62. After determining the animation, the collection view object 62 provides animation data to an animation model and the animation is executed (block 106). Accordingly, any changes between the initial state of the layout of the item and the final state of the layout of the item may be animated.

Figure 17:
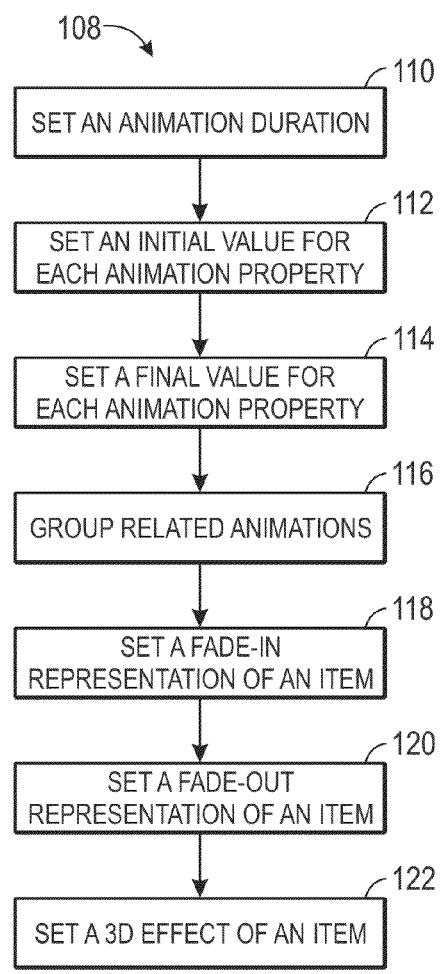
FIG. 17 illustrates a flow chart of a method for configuring animation settings of an animation model.

The collection view object 62 (or a different portion of a software application) may provide multiple settings to the animation model to facilitate animation of the item. As such, FIG. 17 illustrates a flow chart of a method 108 for configuring animation settings of the animation model. The animation model is configured with the animation settings and then the animation model executes the animation based on the animation settings. The settings for the animation may include: setting an animation duration (block 110), setting an initial value for each animation property (block 112), setting a final value for each animation property (block 114), grouping related animations (block 116), setting a fade-in representation of an item (block 118), setting a fade-out representation of an item (block 120), and/or setting a three-dimensional (3D) effect of an item (block 122). As such, the collection view object 62 may provide animation settings to the animation model.

Figure 18:
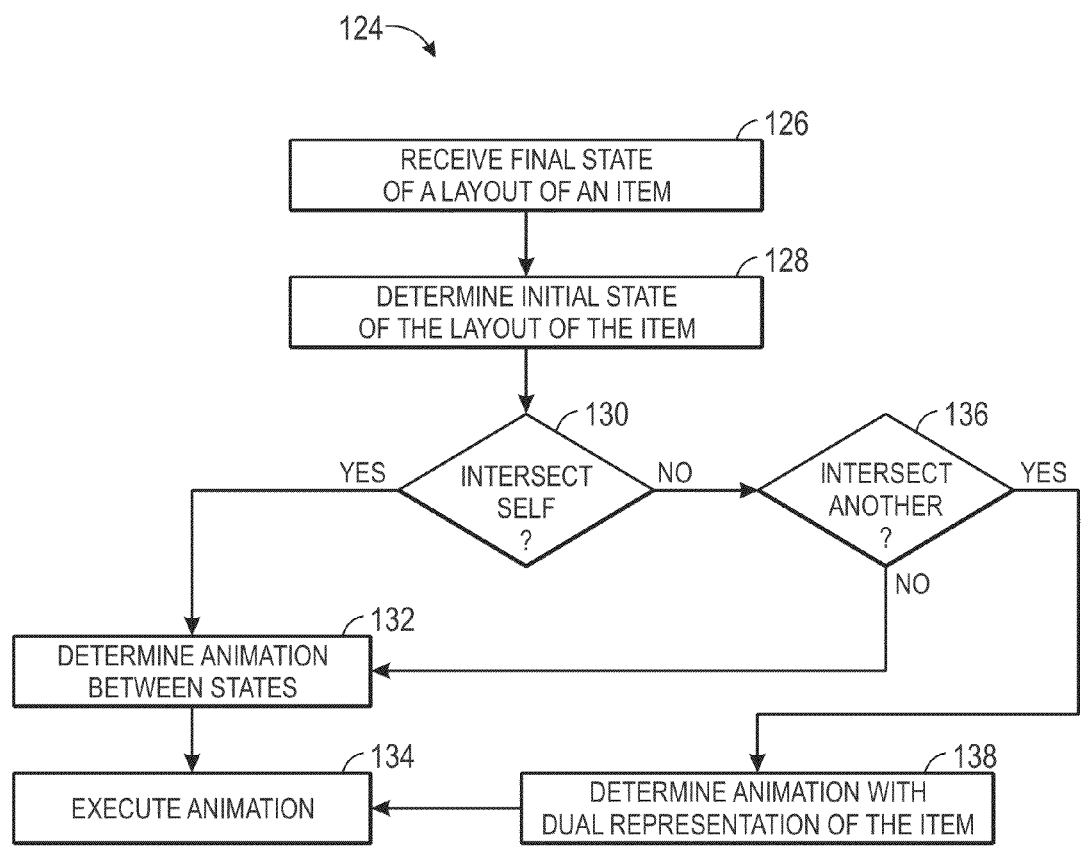
FIG. 18 illustrates a flow chart of a method for determining a type of representation for animation of an item.

The collection view object 62 may be configured to determine whether a single or dual visual representation of an item should be made (e.g., whether the item should be displayed in one cell or two different cells). FIG. 18 illustrates a flow chart of a method 124 for determining the type of representation for animation of an item. In the illustrated embodiment, the collection view object 62 receives data corresponding to a final state of a layout of an item in a collection, such as from the layout object 60 (block 126). The collection view object 62 then determines data corresponding to an initial state of the layout of the item in the collection (block 128). As may be appreciated, the collection view object 62 may determine data corresponding to the initial state of the layout of the item by receiving data corresponding to the initial state of the layout of the item from the layout object 60, or by calculating data corresponding to the initial state of the layout of the item (e.g., using methods described above).

The collection view object 62 then determines whether the item would intersect itself with an animation that transitions between the initial state of the layout of the item and the final state of the layout of the item (block 130). If the collection view object 62 determines that the item would intersect itself, the collection view object 62 determines an animation between the initial state of the layout and the final state of the layout (block 132). The collection view object 62 then executes the animation, such as by providing animation settings to an animation model (block 134).

If the collection view object 62 determines that an animation that transitions between the initial state of the layout and the final state of the layout would not intersect itself, the collection view object 62 determines whether an animation of the item would intersect another item (block 136). Accordingly, if the collection view object 62 determines that the item would not interest another item, the collection view object 62 proceeds to determining an animation (block 132). However, if the collection view object 62 determines that the item would intersect another item, the collection view object 62 determines an animation having a dual representation of the item (block 138). By having a dual representation of the item, the item is shown on the display in two places (e.g., two cells) at the same time, as discussed above. After determining the animation having the dual representation of the item, the collection view object 62 executes the animation (block 134). Therefore, by using the method 124, either a single or a dual visual representation of the item may be displayed based on the initial and final states of the layout of the item. To illustrate such representations, FIGS. 19A-19C show screenshots of an animation having both single and dual item representation.

Figure 19A:
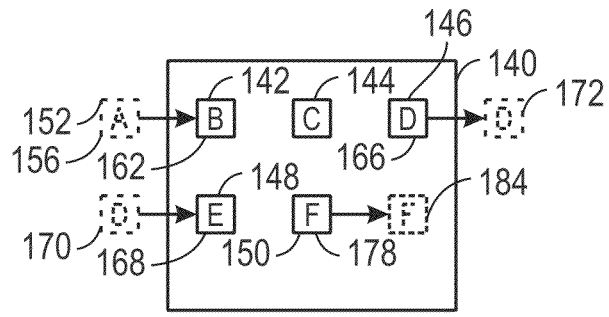
FIGS. 19A-19C illustrate screenshots of an animation with single and dual item representation.
Figure 19B:
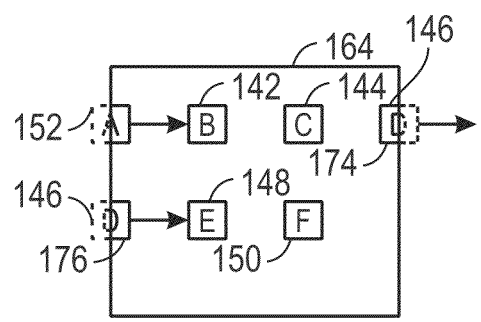

Moreover, FIG. 19A illustrates an embodiment of a screen 140 of the display 12. The screen 140 shows a first collection view layout and includes item B 142, item C 144, item D 146, item E 148, and item F 150. In the illustrated embodiment, a user may desire to add an item A 152 to the displayed collection. As may be appreciated, the item A 152 may be added to any position on the screen 140. In this example, when the item A 152 is added to the screen 140, it will be placed at the front of the collection, where the current item B 142 is positioned. Moreover, the item B 142, the item C 144, the item D 146, the item E 148, and the item F 150 will all shift down and/or to the right to new positions on the screen 140 in a second collection view layout, as illustrated by a screen 154 of FIG. 19C.

Figure 19C:
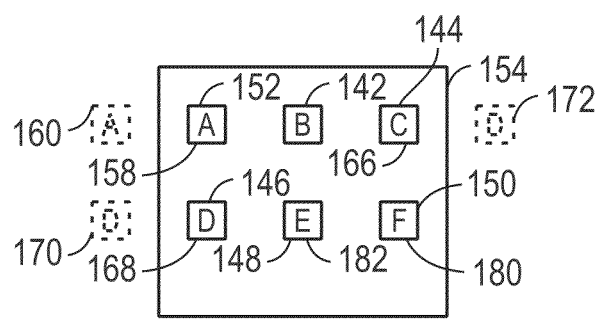

To animate the item A 152 from its initial state at position 156 (in the first collection view layout) off of the screen 140 in FIG. 19A to its final state at position 158 (in the second collection view layout) of the screen 154 in FIG. 19C, the collection view object 62 may determine whether a single or dual visual representation of item A 152 should be used. Accordingly, the collection view object 62 may determine whether the initial state of item A 152 at position 156 (e.g., old representation) in the first collection view layout is the same as the initial state of item A 152 at position 160 (e.g., coming from representation) in the second collection view layout. The collection view object 62 may also determine whether the final state of item A 152 at position 158 (e.g., new representation) in the second collection view layout is the same as the final state of item A 152 at position 162 (e.g., going to representation) in the first collection view layout. If both of the initial states are the same and both of the final states are the same, a single visual representation is used, otherwise a dual visual representation is used. For item A 152, both of the initial states and both of the final states are the same, so a single visual representation is used. A screen 164 of FIG. 19B illustrates a portion of an animation showing the transition of item A 152 from the first collection view layout of screen 140 to the second collection view layout of screen 154.

Furthermore, to animate the item D 146 from its initial state at position 166 (in the first collection view layout) of the screen 140 in FIG. 19A to its final state at position 168 (in the second collection view layout) of the screen 154 in FIG. 19C, the collection view object 62 again determines whether a single or dual visual representation of item D 146 should be used. Accordingly, the collection view object 62 may determine whether the initial state of item D 146 at position 166 (e.g., old representation) in the first collection view layout is the same as the initial state of item D 146 at position 170 (e.g., coming from representation) in the second collection view layout. The collection view object 62 may also determine whether the final state of item D 146 at position 168 (e.g., new representation) in the second collection view layout is the same as the final state of item D 146 at position 172 (e.g., going to representation) in the first collection view layout. Again, if both of the initial states are the same and both of the final states are the same, a single visual representation is used, otherwise a dual visual representation is used. For item D 146, both of the initial states and both of the final states are different, so a dual visual representation is used. The screen 164 of FIG. 19B illustrates a portion of an animation showing the transition of item D 146 from the first collection view layout of screen 140 to the second collection view layout of screen 154. As illustrated, a first visual representation 174 of item D 146 is shown at the same time (e.g., simultaneously) as a second visual representation 176 of item D 146.

To animate the item F 150 from its initial state at position 178 (in the first collection view layout) of the screen 140 in FIG. 19A to its final state at position 180 (in the second collection view layout) of the screen 154 in FIG. 19C, the collection view object 62 may again determine whether a single or dual visual representation of item F 150 should be used. Accordingly, the collection view object 62 may determine whether the initial state of item F 150 at position 178 (e.g., old representation) in the first collection view layout is the same as the initial state of item F 150 at position 182 (e.g., coming from representation) in the second collection view layout. The collection view object 62 may also determine whether the final state of item F 150 at position 180 (e.g., new representation) in the second collection view layout is the same as the final state of item F 150 at position 184 (e.g., going to representation) in the first collection view layout. For item F 150, both of the initial states and both of the final states are the same, so a single visual representation is used. The screen 164 of FIG. 19B illustrates a portion of an animation showing the transition of item F 150 from the first collection view layout of screen 140 to the second collection view layout of screen 154.

The specific embodiments described above have been shown by way of example, and it should be understood that these embodiments may be susceptible to various modifications and alternative forms. For example, it should be appreciated that these techniques for animating between layouts can also be applied to animations within a layout. For instance, these techniques may be used when some parameter changes, such as when pinching the "random" layout or changing the radius of the circle layout, to animate within the changes to the layout. It should be further understood that the claims are not intended to be limited to the particular forms disclosed, but rather to cover all modifications, equivalents, and alternatives falling within the spirit and scope of this disclosure.

The invention claimed is:

1. A method, comprising:
    at an electronic device with a display and one or more input devices:
        displaying, on the display, a first view of a plurality of items in a display region, the first view including a first item; and while displaying the first view, receiving a request, with the one or more input devices, to transition from the first view to a second view in which representations of the plurality of items are displayed at different positions than in the first view; and in response to receiving the request to transition to the second view, displaying, on the display, a transition from the first view to the second view, wherein:
in accordance with a determination that displaying the transition from the first view to the second view includes moving the first item on the first row off of the display region from a first side of the display region and moving the first item onto the display region on a second row from a second side of the display region, the second side of the display region being opposite to the first side of the display region and the second row being distinct from the first row, concurrently displaying during the transition at least a portion of the first item on the first row and at least a second portion of the first item on the second row; and
in accordance with a determination that displaying the transition from the first view to the second view includes moving the first item without moving the first item off of the display region, displaying the first item moving on the first row during the transition.

2. The method of claim 1, including concurrently displaying during the transition the first portion of the first item decreasing on the first row and the second portion of the first item increasing on the second row.

3. The method of claim 2, wherein the decrease in the first portion of the first item on the first row corresponds to the increase in the second portion of the first item on the second row.

4. The method of claim 2, wherein in accordance with the determination that displaying the transition from the first view to the second view includes moving the first item without moving the first item off of the display region, displaying the first item moving on the first row during the transition without displaying the first item on the second TOW.

5. An electronic device, comprising:
a display;
one or more input devices;
one or more processors; and
memory storing one or more programs for execution by the one or more processors, the one or more programs including instructions for:
displaying, on the display, a first view of a plurality of items in a display region, the first view including a first item on a first row; and
while displaying the first view, receiving a request, with the one or more input devices, to transition from the first view to a second view in which representations of the plurality of items are displayed at different positions than in the first view; and
in response to receiving the request to transition to the second view, displaying, on the display, a transition from the first view to the second view, wherein:
in accordance with a determination that displaying the transition from the first view to the second view includes moving the first item on the first row off of the display region from a first side of the display region and moving the first item onto the display region on a second row from a second side of the display region, the second side of the display region being opposite to the first side of the display region and the second row being distinct from the first row, concurrently displaying during the transition at least a portion of the first item on the first row and at least a second portion of the first item on the second row; and
in accordance with a determination that displaying the transition from the first view to the second view includes moving the first item without moving the first item off of the display region, displaying the first item moving on the first row during the transition.

6. The electronic device of claim 5, wherein the one or more programs include instructions for: concurrently displaying during the transition the first portion of the first item decreasing on the first row and the second portion of the first item increasing on the second row.

7. The electronic device of claim 6, wherein the decrease in the first portion of the first item on the first row corresponds to the increase in the second portion of the first item on the second row.

8. The electronic device of claim 6, wherein in accordance with the determination that displaying the transition from the first view to the second view includes moving the first item without moving the first item off of the display region, displaying the first item moving on the first row during the transition without displaying the first item on the second row.

9. A non-transitory computer readable storage medium storing one or more programs, the one or more programs comprising instructions, which when executed by an electronic device with a display, and one or more input devices, cause the electronic device to:
display, on the display, a first view of a plurality of items in a display region, the first view including a first item on a first row; and
while displaying the first view, receive a request, with the one or more input devices, to transition from the first view to a second view in which representations of the plurality of items are displayed at different positions than in the first view; and
in response to receiving the request to transition to the second view, display, on the display, a transition from the first view to the second view, wherein:
in accordance with a determination that displaying the transition from the first view to the second view includes moving the first item on the first row off of the display region from a first side of the display region and moving the first item onto the display region on a second row from a second side of the display region, the second side of the display region being opposite to the first side of the display region and the second row being distinct from the first row, concurrently display during the transition at least a portion of the first item on the first row and at least a second portion of the first item on the second row; and
in accordance with a determination that displaying the transition from the first view to the second view includes moving the first item without moving the first item off of the display region, display the first item moving on the first row during the transition.

10. The computer readable storage medium of claim 9, including instructions, which when executed by the electronic device with the display, and the one or more input devices, cause the electronic device to concurrently display during the transition the first portion of the first item decreasing on the first row and the second portion of the first item increasing on the second row.

11. The computer readable storage medium of claim 10, wherein the decrease in the first portion of the first item on the first row corresponds to the increase in the second portion of the first item on the second row.

12. The computer readable storage medium of claim 10, including instructions, which when executed by the electronic device with the display, and the one or more input devices, cause the electronic device to, in accordance with the determination that displaying the transition from the first view to the second view includes moving the first item without moving the first item off of the display region, display the first item moving on the first row during the transition without displaying the first item on the second row.

* * * * *